United States Patent Office 3,547,914
Patented Dec. 15, 1970

3,547,914
SULFOBENZOYL HYDRAZONES OF 5-NITRO-
FURFURALDEHYDE
André Georges Girard and André Ray, Paris, France, assignors to Roussel-UCLAF, Paris, France, a corporation of France
No Drawing. Continuation-in-part of application Ser. No. 691,988, Dec. 20, 1967. This application May 1, 1968, Ser. No. 725,935
Claims priority, application France, Dec. 26, 1966, 88,828; Mar. 23, 1967, 100,012
Int. Cl. C07d 5/30
U.S. Cl. 260—240
7 Claims

ABSTRACT OF THE DISCLOSURE

A sulfobenzoyl hydrazone of the formula

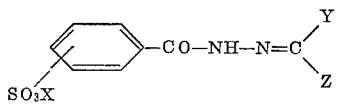

wherein the $SO_3X$ group is in a position selected from the group consisting of meta and para, X represents a member selected from the group consisting of a metal cation and X'H wherein X' represents an organic base, the group

represents a member selected from the group consisting of the remainder of an organic molecule having an aldehyde function where Y is hydrogen, the remainder of an organic molecule having a ketone function and the remainder of an organic molecule having a quinone function. The sulfobenzoyl hydrazones of the invention are useful in the isolation and purification of carbonyl derivatives from mixtures containing the same. The invention more particularly relates to a sulfobenzoyl hydrazone of 5-nitrofurfuraldehyde of the formula

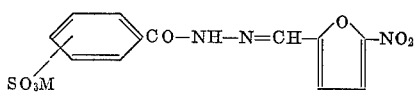

wherein the $SO_3M$ group is in a position selected from the group consisting of meta and para and M represents a member selected from the group consisting of an alkali metal and M'H wherein M' represents tetracycline. These latter compounds are useful as antibiotic, antimycosis and antibacterial agents.

PRIOR APPLICATION

The present application is a continuation-in-part of copending, commonly assigned U.S. patent application Ser. No. 691,988, filed Dec. 20, 1967, now abandoned.

OBJECTS OF THE INVENTION

An object of the present invention is the obtention of a sulfobenzoyl hydrazone of the formula

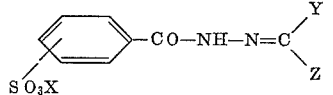

wherein the $SO_3X$ group is in a position selected from the group consisting of meta and para, X represents a member selected from the group consisting of a metal cation and X'H wherein X' represents an organic base, the group

represents a member selected from the group consisting of the remainder of an organic molecule having an aldehyde function where Y is hydrogen, the remainder of an organic molecule having a ketone function and the remainder of an organic molecule having a quinone function.

Another object of the present invention is the development of a process for the production of a sulfobenzoyl hydrazone of the formula

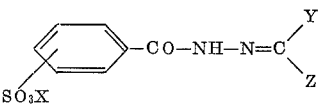

wherein the $SO_3X$ group is in a postion selected from the group consisting of meta and para, X represents a member selected from the group consisting of a metal cation and X'H wherein X' represents an organic base, the group

represents a member selected from the group consisting of the remainder of an organic molecule having an aldehyde function where Y is hydrogen, the remainder of an organic molecule having a ketone function and the remainder of an organic molecule having a quinone function, which comprises the steps of reacting a sulfobenzoyl hydrazide of the formula

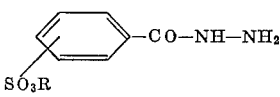

wherein the $SO_3R$ group is in a position selected from the group consisting of meta and para and R is a member selected from the group consisting of hydrogen, a metal cation and R'H wherein R' represents an organic base, with an organic compound containing at least one carbonyl group selected from the group consisting of aldehyde, ketone and quinone, in a solvent selected from the group consisting of polar solvents and mixtures of polar solvents, in the presence of a salt of an organic carboxylic acid selected from the group consisting of metal salts and salts of organic bases, and recovering said sulfobenzoyl hydrazone.

A further object of the present invention is the obtention of a sulfobenzoyl hydrazone of 5-nitrofurfuraldehyde of the formula

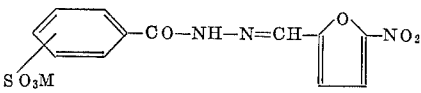

wherein the $SO_3M$ group is in a position selected from the group consisting of meta and para and M represents a member selected from the group consisting of an alkali metal and M'H wherein M' represents tetracycline.

These and other objects of the invention will become more apparent as the description thereof proceeds.

DESCRIPTION OF THE INVENTION

A novel class of sulfobenzoyl hydrazones as well as a process for the preparation of these compounds and processes for their utilization is the subject matter of the present invention.

The invention is more particularly concerned with the meta- or para-sulfobenzoyl hydrazones of the general Formula I

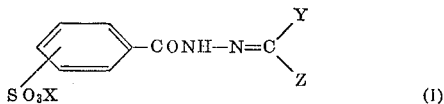

wherein X is a metal cation or X'H wherein X' is an organic base, and the group

represents the remainder of an organic molecule having an aldehyde function when Y is hydrogen, or the group

represents the remainder of an organic molecule having a ketone or quinone function.

The novel compounds of the general Formula I find industrial or therapeutic applications.

Thus, it has been found that the novel compounds of the general Formula I can be used for isolating and/or purifying carbonyl derivatives having an aldehyde, ketone or quinone function, starting from their mixtures with neutral or weakly acid compounds, or from natural media. After separation of the hydrazones, they are easily cleft by the action of strong acids. In this way it is possible to isolate carbonyl compounds from biological media or plant extracts.

The presence on the molecule of the sulfobenzoyl hydrazones of two functional groupings can also be used to effect the resolution of racemic carbonyl compounds or effect the resolution of racemic basic compunds. More particularly, a sulfobenzoyl hydrazone of a racemic aldehyde or ketone can be formed in the form of an alkali metal salt, then one of the optionally active antipodes is precipitated by conversion into salt of an optically active base, such as ephedrine or a phenylaminopropane. It is then easy to cleave the optically active hydrazone to obtain the desired carbonyl compound in an optically active form.

Moreover, it is also possible to form the sulfobenzoyl hydrazone of an optically active carbonyl compound, salify its sulfonic acid group with a nitrogenous base in racemic form (such as alkaloid or an amino acid), then precipitate out the optically active salt of one of the antipodes. This hydrazone may then be cleaved to obtain the nitrogenous compound in an optically active form.

A further and not evident advantage of the hydrazones, which are the object of the invention, is that the alkali salts of Formula I are remarkably soluble and stable in hydroxylated solvents and in water.

On the other hand, the meta- and para-sulfozenzoyl hydrazones of 5-nitro-furfuraldehyde, for example, possess interesting antibacterial and antimycosis activities, particularly in the form of their salts. In this way, the tetracycline salts of the meta- and para-sulfobenzoyl hydrazones of 5-nitro-furfuraldehyde may be used to treat infections in warm-blooded animals caused by staphylococci, streptococci; Gram-negative infections (*Escherichia coli, Klebsiella pneumoniae*); and infections of pathogenic fungi. Finally, these tetracycline salts are not inactive in regard to the Koch bacillus. Moreover, it has been found that these tetracycline salts exhibit a marked synergy, the effectiveness of which has been proved in vivo and in vitro in regard to a large number of Gram-positive or negative clinical strains of bacteria. Their therapeutic effectiveness is higher than that of tetracycline hydrochloride. Moreover, they exhibit a great advantage, compared with other derivatives of tetracycline, because they do not promote the growth of *Candida albicans*, which is responsible for the toxic phenomena occurring during prolonged therapy with derivatives of tetracycline.

Alternatively, the presence of the sulfonic acid group seems to decrease noticeably the toxicity of these hydrazones. Accordingly, the meta-sulfobenzoyl hydrazone of 5-nitro-furfuraldehyde is much better tolerated by the animal than N-(5-nitro-2-furfurylidene) - 1-aminohydantoin (Nitrofurantoin). A dose of 10 mg. per mouse of the metasulfobenzoyl hydrazone of 5-nitro-furfuraldehyde, administered during 5 days does not cause any mortality, whereas the dose of 5 mg. per mouse of N-(5-nitro-2-furfurylidene) - 1-aminohydantoin causes already total mortality.

The process for the preparation of the compounds of the general Formula I, which is also the object of the invention, comprises the reaction of a sulfobenzoyl hydrazide of the Formula II

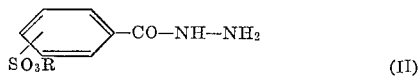

wherein the $SO_3R$ group is in the meta or para position and R is a hydrogen atom, a metal cation or R'H wherein R' represents an organic base, in a polar solvent or a mixture of polar solvents, in the presence of a metal salt of an organic carboxylic acid or a salt of an organic base of an organic carboxylic acid, with a compound having one or several aldehyde, ketone or quinone functions; isolating a compound of general Formula I which is possibly reacted in a polar solvent or a mixture of polar solvents, with a salt of an alkaloid or an antibiotic.

To perform the process of the invention, it is particularly advantageous to start with a meta- or para-sulfobenzoyl hydrazide of Formula II where R is hydrogen. The meta- or para-sulfobenzoyl hydrazide is first reacted in a slightly acid medium in a polar solvent whereby the internal salt of the hydrazide is salified, this reaction being conducted in the presence of an alkali metal or alkaline earth metal or a low-molecular-weight amine salt of an organic carboxylic acid which is soluble in the reaction medium.

Under these conditions, and by proceeding in aqueous or alcoholic medium, the reaction of condensation of the aldehyde, ketone or quinone may be effected in the cold or by heating slightly and for a short time. The sulfonic acid function of the hydrazone formed may also be salified with any organic base according to the required degree of solubility, its dialkylamine salts such as the diethylamine salt or its alkanolamine salts such as the ethanolamine salt, are particularly soluble in water or alcohols.

This reaction is conveniently effected by disolving the meta- or para-sulfobenzoyl hydrazide in water in the presence of the metal or organic base salt of an organic carboxylic acid, then adding an alcohol, preferably a water-miscible alkanol, such as methanol or ethanol, and finally the carbonyl compound containing at least one carbonyl group selected from the group consisting of aldehyde, ketone and quinone, possibly in solution in an alcohol preferably a water-miscible alkanol. As metal salts of an organic carboxylic acid, it is preferable to utilize an ammonium or alkali metal salt of a lower alkanoic acid soluble in the mixture of polar solvents, such as ammonium, lithium or sodium acetates or propionates. As salts of organic bases, the lower alkanolamine and di-lower-alkylamine salts of a lower alkanoic acid such as ethanolamine, triethanolamine, diethylamine acetates or propionates are advantageously utilized.

In the case where the final sulfobenzoyl hydrazones are desired where R is an organic base, giving a salt with a strong tendency toward insolubilization, it is preferable to first obtain the sulfobenzoyl hydrazone in the form of its salt with an alkali metal, dissolve this salt in a polar solvent such as water and add thereto a water-soluble salt of the desired organic base of higher-molecular weight, such as certain alkaloids or antibiotics. A double recomposition occurs between the water-soluble salt of the alkaloid or antibiotic and the alkali metal salt of the sulfobenzoyl hydrazone and the desired organic salt of the sulfobenzoyl hydrazone, having a lower solubility than the other possible salts, separates preferentially.

Accordingly, by mixing, for example, an aqueous solution of the lithium salt of the meta-sulfobenzoyl hydrazone of 5-nitro-furfuraldehyde with an queous solution of tetracycline hydrochloride, the tetracycline salt of the meta-sulfobenzoyl hydrazone of 5-nitro-furfuraldehyde which becomes insoluble, is obtained. In the same way, the tetracycline salt of the para-sulfobenzoyl hydrazone of 5-nitro-furfuraldehyde is obtained from the lithium salt of the para-sulfobenzoyl hydrazone of 5-nitro-furfuraldehyde. The salts of the meta- or para-sulfobenzoyl hydrazones of 5-nitro-furfuraldehyde and of a large number of antibiotics or alkaloids with high molecular weights may also be prepared in a similar manner.

Moreover, the process of the invention may include the following points:

(1) The metal salts of organic carboxylic acids used for the preparation of the metal salts of the meta- or para-sulfobenzoyl hydrazones are ammonium, sodium or lithium acetate or propionate, and the reaction is effected in the presence of a water-miscible lower alkanol, such as methanol or ethanol;

(2) The organic base salts of organic carboxylic acids used for the preparation of the organic base salts of the meta- or para-sulfobenzoyl hydrazones are ethanolamine, triethanolamine, diethylamine acetate or propionate, and the reaction is effected in the presence of a water-miscible lower alkanol, such as methanol or ethanol;

(3) The tetracycline hydrochloride is reacted in aqueous solution with the lithium salt of the meta- or para-sulfobenzoyl hydrazone of 5-nitro-furfuraldehyde to obtain the corresponding tetracycline salt of the meta- or para-sulfobenzoyl hydrazone of 5-nitro-furfuraldehyde.

It has been hereinbefore set forth that the meta-sulfo and para-sulfobenzoyl hydrazones of 5-nitro-furfuraldehyde exhibit an antibacterial and antimycosis activity.

Thus, the antibiotic salts of the meta-sulfo and para-sulfobenzoyl hydrazones of 5-nitro-furfuraldehyde, for example, may be used for therapeutical applications to warm-blooded animals in different pharmaceutical forms. They are then administered orally, transcutaneously or locally as topical application on the skin and mucous membranes or rectally.

They may be presented in the form of injectable solutions or suspensions, in ampoules, in multiple-dose flacons, tablets, coated tablets, flavored powders, granules, emulsions, syrups, suppositories, ovules, intravaginal tablets, pomades, creams, nasal or auricular drops, collyrium, collutories and topical powder sprayers.

The useful dose ranges between about 3 mg./kg. and about 12 mg./kg. per dose and between about 15 mg./kg. and about 80 mg./kg. per day in the warm blooded animals and between 200 mg. and 700 mg. per dose and 1 to 5 gm. per day for an adult, depending upon the mode of administration.

The pharmaceutical forms, such as injectable solutions or suspensions, tablets, coated tablets, flavored powders, granules, emulsions, syrups, suppositories, ovules, intravaginal tablets, pomades, creams, nasal or auricular drops, collyrium, collutories and topical powder sprayers are prepared according to the usual processes.

The starting products used in the process of the present invention are obtained by the process which is described in our U.S. patent application Ser. No. 691,957, filed Dec. 20, 1967.

The following examples illustrate the invention without, however, limiting it in any respect.

EXAMPLE 1

Sodium salt of the meta-sulfobenzoyl hydrazone of 5-nitro-furfuraldehyde 22 gm. of meta-sulfobenzoyl hydrazide and 14.5 gm. of crystallized sodium acetate are dissolved in 40 cc. of water and 150 cc. of methanol are added. The solution is cooled to 20°C. and 14.1 gm. of 5-nitro-furfuraldehyde in solution in 50 cc. of methanol are added. The salt separates rapidly. The reaction mixture is left to stand for three hours in the dark at ordinary temperatures, then in a refrigerator. The salt precipitated is filtered with suction, washed with cold methanol, then with ether. The obtained sodium salt of the meta-sulfobenzoyl hydrazone of 5-nitrofurfuraldehyde (29 gm.) is soluble in water at ordinary temperature.

The product occurs in the form of a sulfur-yellow, microcrystalline powder.

As far as is known, this compound is not described in the literature.

EXAMPLE 2

Lithium salt of the meta-sulfobenzoyl hydrazone of 5-nitro-furfuraldehyde 22 gm. of meta-sulfobenzoyl hydrazide and 12 gm. of crystallized lithium acetate are admixed with 100 cc. of methanol containing 10% of water. The mixture is dissolved by heating and filtered. The filtrate is cooled to about 20° C. 14.1 gm. of redistilled 5-nitro-furfuraldehyde in a solution of 100 cc. of absolute methanol are added. The reaction mixture is kept for three hours at 20° C. in the dark, then in a refrigerator. The precipitated salt is filtered with suction, washed with 150 cc. of iced methanol, then with ether and dried in vacuo. 29 gm. of the desired lithium salt of the meta-sulfobenzoyl hydrazone of 5-nitro-furfuraldehyde are obtained.

At ordinary temperature, this salt is soluble in water.

As far as is known, this compound is not described in the literature.

EXAMPLE 3

Lithium salt of the para-sulfobenzoyl hydrazone of 5-nitro-furfuraldehyde 11 gm. of para-sulfobenzoyl hydrazide and 6 gm. of crystallized lithium acetate are dissolved in 50 cc. of water. The solution is cooled and 7 gm. of 5-nitro-furfuraldehyde in 100 cc. of absolute methanol are added, in the cold. The reaction mixture is left to stand for four hours at ordinary temperature in the dark, then in a refrigerator. The precipitated salt is filtered with suction, washed with ethanol, then with ether.

The lithium salt of the para-sulfobenzoyl hydrazone of 5-nitro-furfuraldehyde crystallizes with 4 molecules of water.

The solubility of the salt, solvated with water, is about 2.5% in water.

As far as is known, this compound is not described in the literatrue.

EXAMPLE 4

Lithium salt of the meta-sulfobenzoyl hydrazone of $\Delta^5$-androsten-3-ol-17-one 2.5 gm. of meta-sulfobenzoyl hydrazide are dissolved with heat in 10 cc. of methanol in admixture with 1 cc. of water, in the presence of 1.2 gm. of crystallized lithium acetate. 2.5 gm. of dehydroandrosterone and 10 cc. of methanol are added, and the whole is taken to reflux. The mixture dissolves; then the condensation product rapidly separates while heating. The reaction mixture is held at reflux for 30 minutes, then cooled. The precipitated salt is filtered with suction and washed with methanol, then with ether. The lithium salt of the meta-sulfobenzoyl hydrazone of $\Delta^5$-androsten-3-ol-17-one is thus obtained. This hydrazone is soluble in water.

As far as is known, this compound is not described in the literature.

EXAMPLE 5

Lithium salt of the β-[meta-sulfobenzoyl hydraxone] of isatin

Under analogous conditions to those of Example 3, the lithium salt of the β-[meta-sulfobenzoyl hydrazone] of isatin may be obtained from isatin.

Likewise, from N-propyl-isatin, N-benzyl-isatin and 5-nitro-isatin, there are obtained the corresponding lithium salts, respectively, the lithium salt of the β-[meta-sulfo-benzoyl hydrazone] of N-propyl-isatin, the lithium salt of the β-[meta-sulfobenzoyl hydrazone] of N-benzyl-isatin and the lithium salt of the β-[meta-sulfobenzoyl hydrazone] of 5-nitro-isatin.

As far as is known, the above hydrazones, obtained in Example 5, are not described in the literature.

EXAMPLE 6

Ethanolamine salt of the para-sulfobenzoyl hydrazone of Δ⁵-pregnen-3-ol-20-one 1 gm. of prenenolone (Δ⁵-pregnen-3-ol-20-one) is heated in 10 cc. of ethanol containing 10% of water in the presence of 0.8 gm. of para-sulfobenzoyl hydrazide and 0.450 gm. of ethanolamine acetate. The whole is heated to reflux of one hour. After cooling, the precipitated salt is filtered with suction and washed with alcohol, then with ether. The obtained ethanolamine salt of the para-sulfobenzoyl hydraxone of Δ⁵-pregnen-3-ol-20-one is soluble in water.

As far as is known, this compound is not described in the liaterature.

EXAMPLE 7

Tetracycline salt of the meta-sulfobenzoyl hydrazone of 5-nitro-furfuraldehyde

A solution of 5.74 gm. of lithium salt of the meta-sulfobenzoyl hydrazone of 5-nitro-furfuraldehyde in 350 cc. of water is added to a solution of 8 gm. of tetracycline hydrochloride in 100 cc. of water. The precipitate formed is filtered with suction, washed with water and dried.

There are thus obtained 6.95 gm. of the tetracycline salt of the meta-sulfobenzoyl hydrazone of 5-nitro-furfuraldehyde having a melting point of 190° to 220° C. and a specific rotation $[\alpha]_D = -149°$ (c.=1% in dimethylformamide).

This compound is easily soluble at the rate of 4 gm./liter in water and 25 gm./liter in methanol.

Analysis for $C_{34}H_{33}N_5SO_{15}$ (molecular weight=783.71).
Calculated (percent): C, 52.10; H, 4.24; N, 8.94; S, 4.09.
Determined (percent): C, 51.9; H, 4.5; N, 8.7; S, 4.2.

Ultraviolet spectrum (ethanol):
Inflection at about 220 mμ (ε=28,750)
$\lambda_{max}$ at 270 mμ (ε=27,800)
$\lambda_{max}$ at 363 mμ (ε=34,600)

As far as is known, this product is not described in the literature.

EXAMPLE 8

Tetracycline salt of the para-sulfobenzoyl hydrazone of 5-nitro-furfuraldehyde

A solution of 1.07 gm. of lithium salt of parasulfobenzoyl hydrazone of 5-nitro-furfuraldehyde in 30 cc. of water is added to a solution of 1.23 gm. of tetracycline hydrochloride in 40 cc. of water. The precipitate formed is filtered with suction, washed with water and dried in vacuo at room temperature. 1.1 gm. of the tetracycline salt of the para-sulfobenzoyl hydrazone of 5-nitro-furfuraldehyde is obtained.

Analysis for $C_{34}H_{33}N_5SO_{15}$ (molecular weight =783.71).
Calculated (percent): C, 52.10; H, 4.24; N, 8.94; S, 4.09.
Determined (percent): C, 51.9; H, 4.6; N, 8.6; S, 4.1.

Ultraviolet spectrum (ethanol):
$\lambda_{max}$ at 222–223 mμ (ε=about 25,100)
$\lambda_{max}$ at 269–270 mμ (ε=about 28,200)
$\lambda_{max}$ at 362 mμ (ε=about 38,400)

As far as is known, this compound is not described in the literature.

The preferred therapeutic salts of the invention are the sulfobenzoyl hydrazones of 5-nitro-furfuraldehyde of the formula

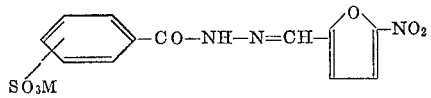

wherein the SO₃M group is in a position selected from the group consisting of meta and para and M represents an alkali metal or M'H wherein M' represents tetracycline.

Both the alkali metal salts and the tetracycline salts of the meta-sulfobenzoyl hydrazone and para-sulfobenzoyl hydrazone of 5-nitro-furfuraldehyde have interesting pharmacological properties. They possess particularly an important antibiotic, antibacterial and antimycosis action. Particularly the tetracycline salts can be utilized in the treatment of warm-blooded animals of infections due to staphylococci, streptococci, Gram-negative bacteria (*Escherichia coli, Klebsiella pneumoniae*) and pathogenic fungi. Finally, the salts are not deprived of activity with reference to Koch's bacilli.

The association in the form of a salt of the acid fraction, the meta- or para-sulfobenzoyl hydrazone of 5-nitro-furfuraldehyde, and the basic fraction, tetracycline, presents a clear synergy, with reference to its components, whose efficacy has been demonstrated in vivo and in vitro against numerous clinical strains of Gram-positive or Gram-negative bacteria. The therapeutic efficacy of the association is superior to that of its components and particularly to that of tetracycline hydrochloride.

In addition, the association salt of the invention presents a great advantage with reference to other derivatives of tetracycline in that it does not cause the development of a *Candida albicans* responsible of toxic phenomena which occurs during prolonged therapy with the derivatives of tetracycline.

The tetracycline salts of the meta- or para-sulfobenzoyl hydrazones of 5-nitro-furfuraldehyde are utilized orally, transcutaneously or topically (on the skin or mucous membranes), or rectally.

They can be prepared in the customary forms of injectable solutions or suspensions, put up in ampoules, multiple-dose flacons, tablets, coated tablets, aromatized powders, granules, emulsions, syrups, suppositories, ovules, intravaginal tablets, pomades, creams, nose or ear drops, collyrium, collutories and pulverized topical powders.

The useful dosology is controlled between 3 mg./kg. and about 12 mg./kg. per does and between about 15 mg./kg. and about 80 mg./kg. per day in the warm-blooded animals and between 200 mg. and 700 mg. per dose and 1 to 5 gm. per day in the adult as a function of the method of administration.

EXAMPLE 9.—PHARMACOLOGICAL STUDY

The tetracycline salt of the meta-sulfobenzoyl hydrazone of 5-nitro-furfuraldehyde (A) Antibiotic activity "in vitro".—The bacteriological activity expressed as a tetracyclic base was determined by direct microbiological titration and ascertained as 580 μg./mg.

The "in vitro" activity of the studied product was determined with respect to numerous strains of pathogenic germs, in comparison with tetracycline (hydrochloride) and with the lithium salt of the meta-sulfobenzoyl hydrazone of 5-nitro-furfuraldehyde.

(1) Gram-positive bacteria (a) *Staphylococcus aureus*.—The determinations of activity were effected in a nutritive medium, oxoid No. 2, at a pH of 7.3 (readings made after 24 hours in an incubator at 37° C.). The minimum inhibitory concentrations (M.I.C.), expressed in μg. of the active product per cc. of medium, were the following with reference to the diverse strains of the pathogenic staphylococi studied.

| Strains | Lithium salt of the meta-sulfobenzoyl hydrazone of 5-nitro-furfuraldehyde | Tetracycline hydrochloride | Studied product |
|---|---|---|---|
| 5905 | | 15 | 100 | 15 |
| 6075 | | 40 | 100 | 15 |
| L.U | | 30 | 0.3 | 0.3 |
| 254/63 | | 40 | 20 | 10 |
| 2253/63 | | 15 | 220 | 10 |
| 2387/63 | | 15 | 100 | 15 |
| 2393/63 | | 40 | 60 | 30 |
| 2946/63 | | 20 | >100 | 20 |
| 917 | | 30 | 20 | 20 |
| 758 | | 100 | 100 | 40 |
| 4958 | | 60 | ≥0.1 | ≥0.1 |
| 6075 | | 100 | 100 | 40 |
| 6043/60 | | 40 | 0.2 | 02 |
| 8905/60 | | 20 | 0.2 | 0.1 |
| 7509/60 | | 40 | 0.2 | ≥0.05 |
| 6816/62 | | 40 | 0.2 | 0.1 |
| 6723/62 | | 20 | 0.2 | 0.1 |
| 8516/62 | | >40 | 1 | 0.4 |
| 8662/62 | | 40 | 0.2 | 0.1 |
| 3035/63 | | 10 | 0.2 | ≥0.05 |

These results demonstrate a good synergy of the tetracycline and the meta-sulfobenzoyl hydrazone of 5-nitro-furfuraldehyde in the form of a saline combination, since the minimum inhibitory concentrations of the studied product, giving a complete inhibition of the diverse strains of the staphylococci mentioned, were always lower than those of the more active component, taking into consideration that the studied product comprised 56.7% of tetracycline and 43.3% of the meta-sulfobenzoyl hydrazone of 5-nitro-furfuraldehyde. Moreover, with the strains which were only slightly sensitive or resistant to one or the other of the components, nevertheless a good activity of the studied product was noted.

(b) *Enterococci.*—The minimum inhibitory concentrations (M.I.C.) given in μg. of the active product per cc. of the medium, determined under the same conditions as previously indicated, in comparison with pathogenic enterococci strains, were as follows:

| Strains | Lithium salt of the meta-sulfobenzoyl hydrazone of 5-nitro-furfuraldehyde | Tetracycline hydrochloride | Studied product |
|---|---|---|---|
| 5435 I.P | | 100 | 0.4 | 0.4 |
| 5436 I.P | | 200 | 0.4 | 0.4 |
| 6582/60 | | 200 | 20 | 20 |

With reference to these strains which were only very slightly sensitive to the lithium salt of the meta-sulfobenzoyl hydrazone of 5-nitro-furfuraldehyde, a good activity of the studied product was observed, since the minimum inhibitory concentrations of the studied product were identical to those of tetracycline, although the studied product comprised only 56.7% of this antibiotic. The studied product has consequently a synergistic effect brought on by the combination of the two components.

(c) *Hemolytic streptococci.*—The minimum inhibitory concentrations (M.I.C.) expressed in μg. of the active product per cc. of medium, determined in a buffered glucose broth after 48 hours in the incubator at 37° C. with reference to pathogenic streptococci strains of clinical original were the following:

| Strains | Lithium salt of the meta-sulfobenzoyl hydrazone of 5-nitro-furfuraldehyde | Tetracycline hydrochloride | Studied product |
|---|---|---|---|
| 758 | 60 | 100 | 40 |
| 1415 | 20 | 100 | 20 |

Here too, a synergistic effect of the combination of the two components in the form of salt was observed.

(2) Tubercular bacilli

The activity of the tetracycline salt of the meta-sulfobenzoyl hydrazone of 5-nitro-furfuraldehyde was determined with reference to Dubos medium of Tween-albumen, by reading the inhibitions noted after 10 days in an incubator at 37° C. with nine different strains of tubercular bacilli originating from samples obtained in a hospital (sputum or pleural fluid). For all of these strains, the minimum inhibitory concentrations of the studied product were between 5 and 15 μg/cc., and most frequently 10 μg./cc., even in the case of the strains resistant to P.A.S. or to streptomycin.

(3) Gram-negative bacteria

The minimum inhibitory concentrations in μg. of the active product per cc. of liquid, determined in a nutritive medium, oxoid No. 2, pH=7.3, after 24 hours in an incubator at 37° C. with pathogenic strains of clinical origin, were the following.

| Strains | Lithium salt of the meta-sulfobenzoyl hydrazone of 5-nitro-furfuraldehyde | Tetracycline hydrochloride | Studied product |
|---|---|---|---|
| *Salmonella para* B 5159/60 | 100 | 5 | 5 |
| *Shigella sonnei* 3983 | 400 | 5 | 5 |
| *Shigella sonnei* 4035 | 150 | 5 | 5 |
| *Shigella flexneri* X (I.P.) | >400 | 10 | 10 |
| *Klebsiella pneumoniae* 12047/62 | >400 | 40 | 40 |
| *Klebsiella pneumoniae* 5280/63 | 75 | 1 | 1 |
| *Klebsiella pneumoniae* 10031/63 | >400 | 0.4 | 0.4 |
| *Klebsiella pneumoniae* 5805/62 | 200 | 100 | 75 |
| *Klebsiella pneumoniae* 11418/62 | >400 | 75 | 75 |
| *Klebsiella pneumoniae* 12645/64 | 75 | 1 | 0.4 |
| *Escherichia coli* 6623/62 | 75 | 1 | 0.4 |
| *Escherichia coli* 2566/63 | 75 | 1 | <0.2 |
| *Escherichia coli* 3732/63 | 100 | 1 | 0.4 |
| *Escherichia coli* 5022/63 | 150 | 3 | 1 |
| *Escherichia coli* 7600 26 B5 | 100 | 1 | <0.2 |
| *Escherichia coli* 3289 55 B5 | 75 | >100 | 50 |

For these different strains, the minimum inhibitory concentrations of the studied product were lower or identical to those of tetracycline, although the studied salt contained only 56.7% of this antibiotic. With these strains, the lithium salt of the meta-sulfobenzoyl hydrazone of 5-nitro-furfuraldehyde had only a slight activity. These tests demonstrate a synergistic effect brought about by the combination of the two components.

(4) Antibacterial action in the presence of serum

The bacteriostatic effect was examined in the presence of serum, by determination of the minimum inhibitory concentrations with diverse strains, in plain media or with an addition of 10% of calf serum. The results were as follows.

| Strains | Lithium salt of the meta-sulfobenzoyl hydrazone of 5-nitro-furfuraldehyde | | Tetracycline hydrochloride | | Studied product | |
|---|---|---|---|---|---|---|
| | Without serum | With serum | Without serum | With serum | Without serum | With serum |
| *Staphylococcus aureus* L.W | 100 | 100 | 0.4 | 0 4 | 0.4 | 0.2 |
| *Staphylococcus aureus* Mercier | 100 | 150 | 1 | 1 | 1 | 4 |
| *Staphylococcus aeurus* 2159 | 100 | 100 | 200 | 100 | 150 | 150 |
| Klebsiella A.215 | 100 | 100 | 0.2 | 0.4 | 0.4 | ≤0.2 |
| *E. coli* 26 B6 | 100 | 100 | 0.1 | 0.4 | 0.4 | 0.4 |

These results show that the activity was practically not influenced by the presence of the serum, and that the synergistic effect of the combination of the two active principles in the form of the salt were also to be observed in the presence of the serum.

(5) Antifungic activity

The lithium salt of the meta-sulfobenzoyl hydrazone of 5-nitro-furfuraldehyde showed a certain inhibitory activity with reference to *Candida albicans, Candida tropicalis, Candida pseudotropicalis, Candida krusei* (the M.I.C. varies from 50 to 2000 μg./cc. in a liquid Sabouraud medium, according to the strains). This property was conferred to the studied product. Thus, on nine strains of *Candida albicans*, one strains of *Candida tropicalis* and one strain of *Candida krusei*, the studied product caused the inhibition of the growth in an agar culture ("Nystatin assay agar," antibiotic medium 12) at concentrations of 5 to 10 μg./cc.

This action of the studied product indicates its utility to avoid the proliferation of *Candida albicans* in the intestine.

With reference to diverse pathogenic fungi; *Epidermophyton flocosum, Aspergillus fumigatus, Microsporum canis, Trichophyton schoenleini, Trichophyton rubrum, Trichophyton rosaceum*, the minimum inhibitory concentrations of the studied product in an agar Sabouraud medium varied from 100 to 2,000 μg./cc. Its activity with reference to these fungi was, consequently, not negligible.

(6) Antibacterial activity of the studied product in the form of a pomade

The activity of a pomade containing 1% of the studied product (in an excipient of polyethyleneglycol) was evaluated in comparison with diverse pathogenic strains of bacteria and fungi in the following fashion. The agar culture medium was cast in a well solidified bed in Petri dishes, then inoculated with the studied germ. With the aid of a punch of a 1 cm. diameter, a circular lamella of the agar culture was removed under sterile conditions, leaving a cup in which a constant amount of the pomade was introduced. The dishes with the agar culture medium were then incubated at a temperature of 37° C.

A circular area of inhibition proportional to the activity of the pomade was observed. The diameter of these inhibitory zones was as follows.

| Strains | Culture media | Duration of incubation | Diameter of zones, mm. |
|---|---|---|---|
| *Staphylococcus aureus* hemolytic S | DST agar base, pH=7.4 | 18 hrs, at 37° | 22 |
| *Staphylococcus aureus* LW | do | do | 23 |
| *Klebsiella pneumoniae* A.215 | do | do | 25 |
| *E. coli* 26 B6 | do | do | 21 |
| *Pseudomonas aeruginosa* 9818 | Oxoid DST | do | 26 |
| *Pseudomonas aeruginosa* 6609 | do | do | 33 |
| *Pseudomonas aeruginosa* 2593 | do | do | 28 |
| *Pseudomonas aeruginosa* 4052 | do | do | 29 |
| *Trichophyton rubrum* | Oxoid Sabouraud glucose | 8 days at 24° | 20 |
| *Trichophyton rosaceum* | do | do | 16 |

These results showed that in the form of a 1% pomade, the studied product diffused satisfactorily in the agar medium and exhibited a good activity in reference to Gram-positive and Gram-negative germs and certain fungi.

(B) Determination "in vivo" of the therapeutic efficacy in experimental infections (1) *Infection with staphylococci.*—Mice, divided into groups of ten each, were infected by intraperitoneal administration with 0.30 cc. of a staphylococci culture of the TIN strain and treated by administering orally for two consecutive days (at an interval of 16 hours), the studied product. Comparisons were also made with the lithium salt of the meta-sulfobenzoyl hydrazone of 5-nitro-furfuraldehyde and tetracycline hydrochloride. The therapeutic effect was determined by taking into account the amount of mortality of the animals as a function of time. The following results were obtained. (All of the infected control animals died rapidly during the course of the test.)

| Product administered | Unitary dose per mouse, mg. | Therapeutic action (aver. 3 tests), percent of survivals |
|---|---|---|
| Tetracycline salt of the meta-sulfobenzoyl hydrazone of 5-nitro-furfuraldehyde. | 0.50 | 95 |
| | 0.25 | 94 |
| | 0.10 | 90 |
| Lithium salt of the meta-sulfobenzoyl hydrazone of 5-nitro-furfuraldehyde. | 0.50 | 20 |
| | 0.25 | 0 |
| | 0.10 | 0 |
| Tetracycline hydrochloride. | 0.50 | 100 |
| | 0.25 | 99 |
| | 0.10 | 94 |

The therapeutic effect of the studied product can thus be considered as satisfactory, allowing for the fact that it comprised 56.7% of the tetracycline base, and that in this grave infection with staphylococci, the lithium salt of the meta-sulfobenzoyl hydrazone of 5-nitro-furfuraldehyde itself exhibited only a weak activity.

The tolerance of the studied product was found to be very satisfactory at the doses administered.

(2) *Infections with hemolytic streptococci.*—In an experimental infection brought on by inoculation of a streptococci culture of the M strain to groups of ten mice each, the therapeutic effect observed after oral administration of the studied product for four consecutive days was as follows.

| Product administered | Unitary dose per mouse, mg. | Therapeutic action, percent of survivals |
|---|---|---|
| Tetracycline salt of the meta-sulfobenzoyl hydrazone of 5-nitro-furfuraldehyde. | 1 | 63 |
| | 0.5 | 60 |
| Lithium salt of the meta-sulfobenzoyl hydrazone of 5-nitro-furfuraldehyde. | 1 | 0 |
| | 0.5 | 0 |
| Tetracycline hydrochloride. | 1 | 84 |
| | 0.5 | 80 |

The therapeutic effect of the studied product with regard to this streptococci infection was distinct, whereas the lithium salt of the meta-sulfobenzoyl hydrazone of 5-nitro-furfuraldehyde was inactive at the given doses.

(3) *Infections with coli bacilli.*—In a coli bacilli infection caused in mice (groups of ten animals each) by inoculation of a culture of *Escherichia coli* (Star strain), after the oral administration of a single dose of the studied product, the following therapeutic effect was observed.

| Product Administered | Unitary dose per mouse, mg. | Therapeutic action, percent of survivals |
|---|---|---|
| Tetracycline salt of the meta-sulfobenzoyl hydrazone of 5-nitro-furfuraldehyde. | 2 | 100 |
| | 1 | 93 |
| | 0.5 | 58 |
| Lithium salt of the meta-sulfobenzoyl hydrazone of 5-nitro-furfuraldehyde. | 2 | 42 |
| | 1 | 5 |
| | 0.5 | 0 |
| Tetracycline hydrochloride. | 2 | 100 |
| | 1 | 97 |
| | 0.5 | 70 |

The therapeutic effect of the studied product was closely related to that of the tetracycline hydrochloride and very superior to that of the lithium salt of the meta-sulfobenzoyl hydrazone of 5-nitro-fufuraldehyde, taking into account its content of the tetracycline base. This effect was very satisfactory.

(4) *Infections with typhoid bacilli.*—In an experimental infection brought on by the inoculation of a culture of *Salmonella typhi* (strain of clinical origin), to groups of ten mice each, the therapeutic effect, observed following the oral administration of a single dose of the studied product, was as follows (average of three tests).

| Product administered | Dose per mouse, mg. | Therapeutic action, percent of survival |
|---|---|---|
| Tetracycline salt of the meta-sulfobenzoyl hydrazone of 5-nitro-furfuraldehyde. | 2<br>1 | 52<br>43 |
| Lithium salt of the meta-sulfobenzoyl hydrazone of 5-nitro-furfuraldehyde. | 2<br>1 | 10<br>0 |
| Tetracycline hydrochloride. | 2<br>1 | 78<br>70 |

The therapeutic effect of the studied product in this severe infection with typhoid bacilli, treated with a single dose of the said product, was very distinct.

(C) Tolerance of the studied product in the presence of *Candida albicans*

An aqueous suspension of *Candida albicans* cells (Ly strain isolated from a surgical bile) was prepared starting with a 48-hour aged culture on the Sabouraud agar medium in such a fashion that 0.3 cc. corresponded with about 100 million viable cells. This suspension was injected intraperitoneally in 100 white mice, each animal weighing from 20 to 22 gm., divided into five groups of twenty mice each. For the last four lots, the suspension of the *Candida albicans* cells was admixed with the compound to be tested. The first group received the suspension of cells without antibiotics (control group). The following results were observed 26 hours after the injection.

| Product administered at same time as the *Candida albicans* cells | Doses per animals, mg. | No. of deaths at 26th hour |
|---|---|---|
| Controls inoculated | 0 | 1 |
| Tetracycline hydrochloride | 4 | 20 |
| Studied product | 4 | 7 |
| Lithium salt of the metasulfobenzyl hydrazone of 5-nitro-furfuraldehyde | 4 | 1 |
| Tetracycline + mystatine | 3.2+0.8 | 19 |

These results showed that for an idential inoculation of *Candida albicans*, a toxicity was observed which was considerably increased in the case of tetracycline hydrochloride than in the case of the studied product, at the same ponderal dose. This advantage of the studied product is attributed to the presence of 43.3% of the meta-sulfobenzoyl hydrazone of 5-nitro-furfuraldehyde in its molecule. This latter compound administered alone, under the same conditions, avoided nearly completely the occurrence of toxic phenomena in the presence of *Candida albicans*. Furthermore, it was ascertained that even the tetracycline-nystatine association appeared significantly more unfavorable under these conditions than the studied product. This indicated a practical interest in the utilization of the studied product, when, in the intestinal environment, infections with *Candida albicans* were additionally associated with bacterial infections.

CONCLUSIONS

The tetracycline salt of the meta-sulfobenzoyl hydrazone of 5-nitro-furfuraldehyde shows the following advantages.

In vitro (1) A synergistic action of the combination of the two constitutents with reference to diverse clinical strains of staphylococci, enterococci, hemolytic streptococci, Salmonella, Shigella, *Klebsiella pneumoniae, Escherichia coli*;

(2) An antibacterial activity very little influenced by the presence of serum, and (3) A notable antifungic activity with reference to clinical strains of *Candida albicans, Candida tropicalis, Candida krusei,* and, to a lesser degree, with reference to pathogenic fungi, such as Trichophyton, Microsporum, Epidermophyton.

The antibacterial and antifungicidal activity over broad spectra of the studied product was likewise verified in the form of a 1% pomade.

In vivo

The studied product exhibited a good therapeutic efficacy: in acute infections with very rapid evolution; its therapeutic effect was equivalent or superior to that of the tetracycline contained in the combination, in the case of staphylococci and coli bacilli infections, in the case of infections with streptococci and typhoid bacilli.

Lastly, in the presence of a *Candida albicans* culture, simultaneously administered to the mice by intraperitoneal injection, the studied product prevented any development of toxic phenomena such as were observed with the administration of tetracycline hydrochloride alone.

EXAMPLE 10

Antibacterial activity of the tetracycline salt of the para-sulfobenzoyl hydrazone of 5-nitro-furfuraledhyde The antibacterial activity of this product was determined "in vitro" with reference to diverse Gram-positive and Gram-negative strains comparatively with tetracycline hydrochloride and with the lithium salt of the para-sulfobenzoyl hydrazone of 5-nitro-furaldehyde.

The results obtained are summarized in the following table.

| Strains | Tetracycline hydrochloride | Lithium salt of the para-sulfobenzoyl hydrazone of 5-nitro-furfuraldehyde | Tetracycline salt of the para-sulfobenzoyl hydrazone of 5-nitro-furfuraldehyde |
|---|---|---|---|
| *Staphylococcus aureus* Oxford | 0.2 | 100 | 0.2 |
| *Staphylococcus aureus* clinic | 100 | 60 | 40 |
| *Staphylococcus hemolytic* | 1 | 400 | 1 |
| *Bacillus subtilis* | 0.05 | 40 | 0.1 |
| *Escherichia coli* clinic | 1 | 100 | 10 |
| *Escherichia coli* clinic | 200 | 100 | 100 |
| *Klebsiella pneumoniae* | 1 | 200 | 2 |
| *Salmonella typhimurium* | 2 | 100 | 2 |
| *Proteus mirabilis* | 100 | >400 | 200 |
| *Pseudomonas pyocyanea* | 40 | >400 | 100 |

NOTE.—Minimum inhibitive concentrations (in μg./cc.).

According to these results, it was ascertained that the antibacterial activity of the tetracycline salt of the para-sulfobenzoyl hydrazone of 5-nitro-furfuraldehyde derivative had an activity similar to that of its above mentioned meta isomer. A synergistic action of the two components was encountered here again, taking into account the composition of the salt. This synergistic effect, however, was more distinct and more constant in the case of the meta derivative than in the case of the para derivative.

EXAMPLE 11

Determination of the toxicity of the tetracycline salt of the meta-sulfobenzoyl hydrazone of 5-nitro-furfuraldehyde (1) *Acute toxicity.*—The oral administration of 1 and 2 gm./kg. of the studied product to mice did not cause any mortality of the animals.

(2) *Chronic toxicity.*—The studied product was regularly included in the food of two groups of ten male rats, weighing 130 gm. each, at the rate of 0.2% and 0.4% over a period of one month. This corresponded to daily actual doses of 226 and 456 mg./kg. of animal weight during one month (according to the amounts of food consumed). The studied product was completely tolerated under these conditions, mortality, zero; general condition, excellent; curve of growth, identical to that of the control animals; hematological and anatomopathological examinations, satisfactory (no difference with the control animals, absence of histological lesions in the kidneys, liver, suprarenal glands, testicles).

In another series of tests, two lots of six male rats each, were utilized. One lot received daily, over a period of 24 day, by means of a stomach sound, 1 cc. of distilled water per animal (control group), and the other lot received a suspension of the studied product in 1 cc. of distilled water per animal, at a dose of 200 mg. of the studied product per one kg. of animal weight.

The general condition of the treated animals was excellent and, at the end of the test, the increase in weight of these animals was 95 grams (average), while that of the control animals was 74 grams (average).

The autopsies executed on the 25th day of the test did not reveal any macroscopic lesions of the organs. The tolerance of the studied product under the conditions described were, therefore, very satisfactory.

The preceding specific embodiments are illustrative of the practice of the invention. It is to be understood, however, that other expedients known to those skilled in the art, can be employed without departing from the spirit of the invention or the scope of the appended claims.

We claim:
1. A sulfobenzoyl hydrazone of the formula

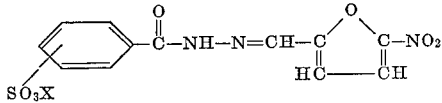

wherein the SO₃X group is in a position selected from the group consisting of meta and para and X is selected from the group consisting of an alkali metal cation, and X'H wherein X' is selected from the group consisting of tetracycline, NH₃, phenylalkyl amine, dialkyl amine and mono and polyhydroxylalkyl amine.

2. The compound of claim 1 wherein the SO₃X group is in the meta position and X is sodium.
3. The compound of claim 1 wherein the SO₃X group is in the meta position and X is lithium.
4. The compound of claim 1 wherein the SO₃X group is in the para position and X is lithium.
5. The compound of claim 1 wherein the SO₃X group is in the meta position and X is X'H wherein X' is tetracycline.
6. The compound of claim 1 wherein the SO₃X group is in the para position and X is X'H wherein X' is tetracycline.
7. A sulfobenzoyl hydrazone of 5-nitro-furfuraldehyde of the formula

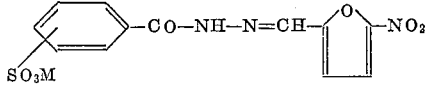

wherein the SO₃M group is in a position selected from the group consisting of meta and para and M represents a member selected from the group consisting of an alkali metal and M'H wherein M' represents tetracycline.

References Cited
UNITED STATES PATENTS
3,459,800  8/1969  Salat et al. _____ 260—559

OTHER REFERENCES
Carron et al., Ann. Pharm. Franc. 21, 287–97 (1963).
Dodd et al., J. Amer. Pharm. Assn. 39, 313–8 (1950).

HENRY R. JILES, Primary Examiner

G. T. TODD, Assistant Examiner

U.S. Cl. X.R.

260—559, 325, 507; 424—285, 238, 274, 324